Patented May 6, 1930

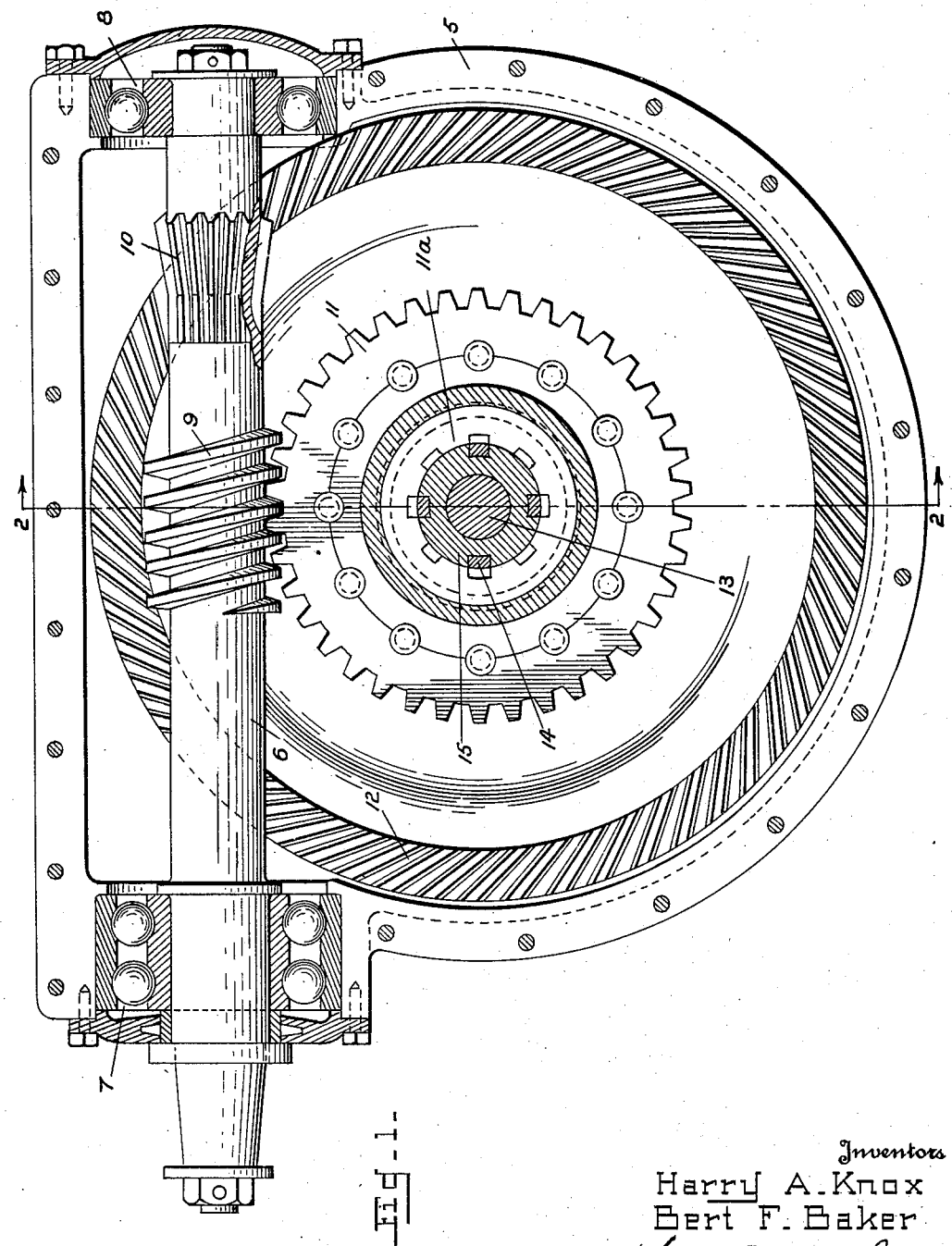

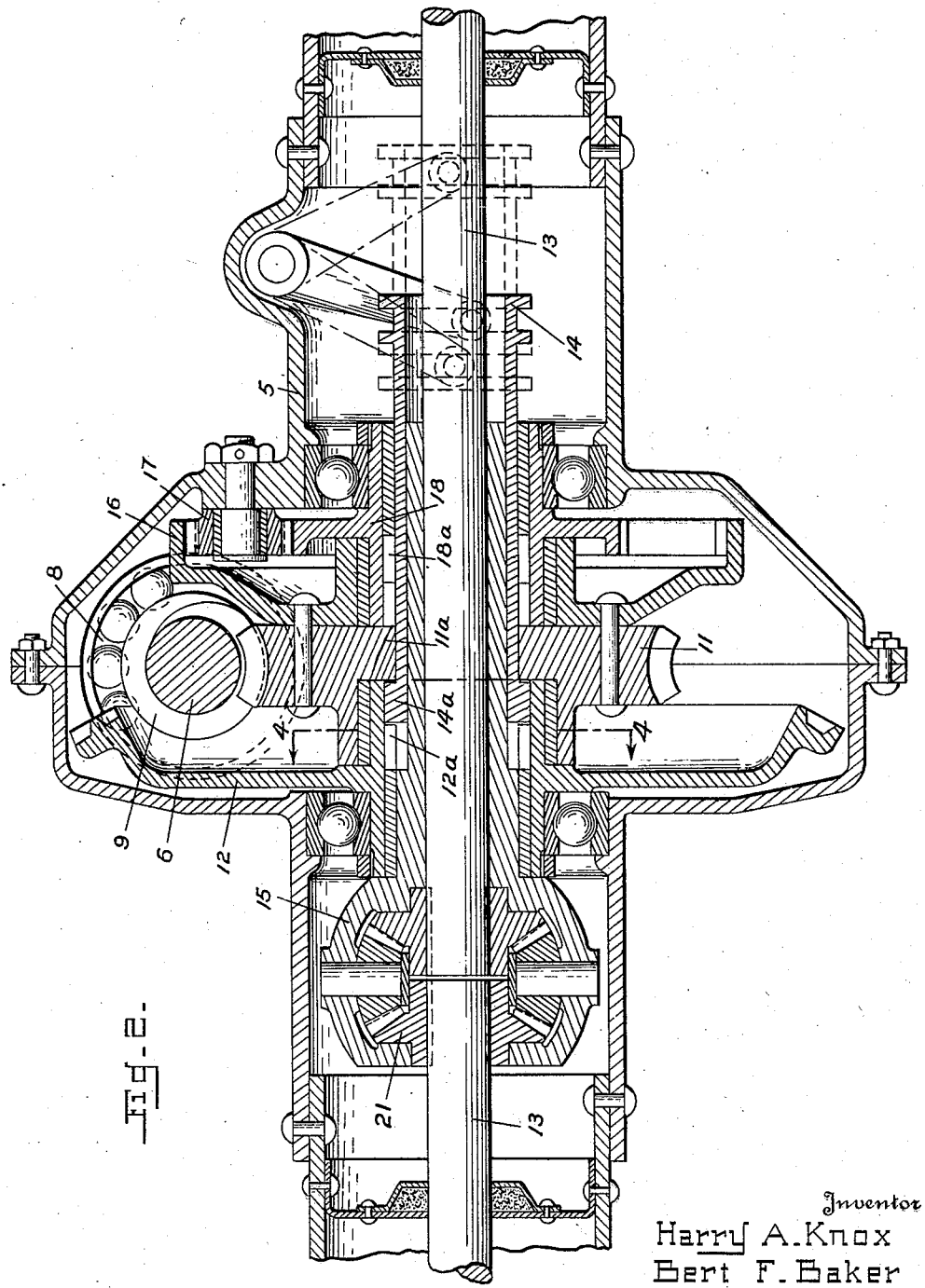

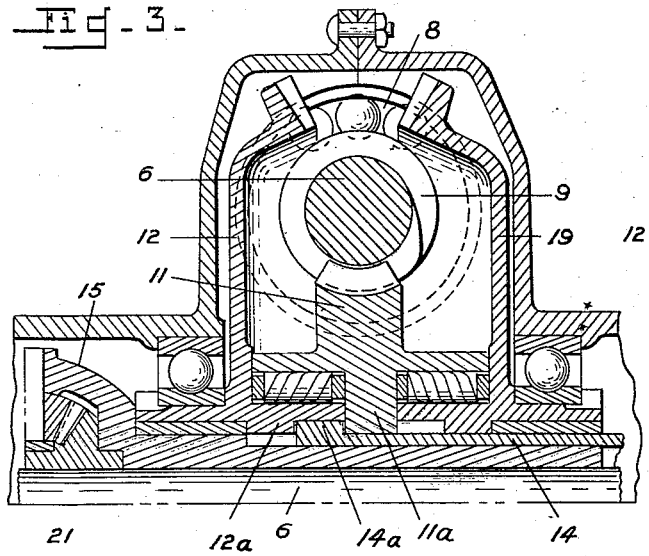
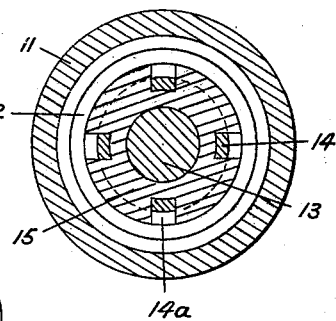
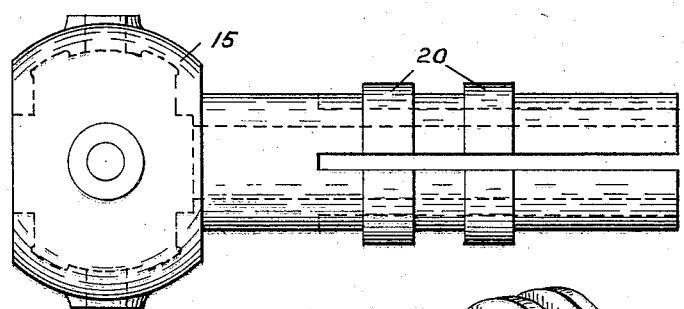
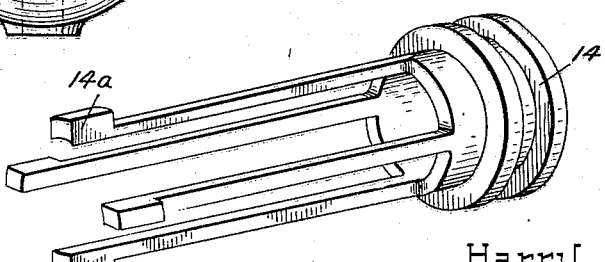

1,757,052

UNITED STATES PATENT OFFICE

HARRY A. KNOX AND BERT F. BAKER, OF DAVENPORT, IOWA

TRANSMISSION

Refiled for abandoned application Serial No. 100,764, filed April 8, 1926. This application filed November 5, 1928. Serial No. 317,454.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to us of any royalty thereon.

The subject of this invention is a transmission, and is a substitute for application, Serial No. 100,764, filed April 8, 1926.

In adapting the internal combustion engine to the varied conditions of automobile propulsion, a transmission or change speed gearing is employed according to established principles to give the required speed ratios between the engine and rear axle. In present practice the transmission is located directly in rear of the engine and includes a number of shafts, gears, bearings, etc., the whole unit being inclosed in a box and producing a sound box effect on the body. When driving through any set of reducing gears the noise and clashing is so strident that the operator shifts into direct drive sooner and oftener than the conditions of travel warrant.

With a view to eliminating the foregoing undesirable features and with the purpose of considerably simplifying the mechanism while promoting its efficiency and durability, we propose a radical departure in both the type and arrangement of the transmission.

The present invention is characterized principally by the installation of the change speed gear set in the rear axle, by the provision on the drive shaft of pinions of an inherently quiet type which continuously actuate the gear wheels and, by the selective coupling of the gear wheels direct to the final driven unit.

To these and other ends, our invention consists in the construction, arrangement and combination of elements as described hereinafter and pointed out in the claims forming a part of this specification.

A practical embodiment of the invention is illustrated in the accompanying drawings, wherein:

Fig. 1 is a longitudinal sectional view through the improved transmission;

Fig. 2 is a transverse sectional view on the line 2—2 of Fig. 1;

Fig. 3 is a sectional view showing an alternate method of obtaining reverse;

Fig. 4 is a sectional view on the line 4—4 of Fig. 2;

Fig. 5 is a plan view of the differential housing;

Fig. 6 is a perspective of the clutch member.

Referring to the drawings by numerals of reference:

The transmission is inclosed in the axle housing 5 which according to custom is formed of two parts joined on the center line of the vehicle. The drive shaft 6 which receives power direct from the engine is supported both front and rear by bearings 7 and 8 so that the driving gears carried thereby intermediate the bearings will always be in mesh with the driven gears without being overhung.

In the preferred embodiment of the invention the driving gears comprise a worm 9 and a skew bevel pinion 10 fast on the drive shaft and meshing respectively with a worm wheel 11 and a skew bevel wheel 12 both of these wheels being disposed concentrically with driving axles 13—13 and having internal teeth 11$^a$ and 12$^a$, preferably eight in number which may be engaged by a sliding clutch 14 splined on an extension of the differential housing 15. To facilitate engagement with the teeth 11$^a$ and 12$^a$ the clutch is formed with but four teeth 14$^a$ as will be clearly seen in Fig. 6.

Because of its strength, silence in operation and large velocity reduction the worm drive is preferably utilized to obtain low speed while the skew bevel gear is admirably adapted for high speed.

As shown in Fig. 2 the provision for obtaining reverse drive consists of reduction gearing of which the ring gear 16 is carried by the worm wheel, the pinions 17 are fast to the housing 5 and the sun wheel 18 is coaxial with the driven wheels 11 and 12. The sun wheel is also formed with internal teeth 18$^a$ for engagement with the clutch 14.

Suggestive of the many modifications to which the invention lends itself is the provision for securing the reverse drive illustrated in Fig. 3 wherein a second skew bevel wheel 19 is driven by the skew pinion 10, but if desired, an additional pinion might be provided on the drive shaft to gear with a larger wheel.

It will be noted that the differential housing 15 (Fig. 5) is formed with a pair of annular shoulders 20—20 which correspond to the neutral positions of the clutch member and which are provided to constitute bearing surfaces for the inner ends of the bevel wheel 12 and the sun wheel 10.

The differential mechanism 21 is of conventional design and is arranged directly adjacent the change speed gear set. The gear shaft control for actuating the clutch member 14 may be of any suitable type operable from the driver's seat.

In operation the forward and reverse driven wheels are always rotating no matter if the clutch is in neutral or in engagement with any one of them. By manipulation of the clutch the drive is selectively taken direct to the differential housing.

Among the advantages of our improved transmission are the following:

(1) Direct drive at both low and high speed affords exceptionally quiet operation.

(2) Utilization of worm and skew bevel gearing in a transmission, these types affording more silent operation and possessing greater durability than the spur or spiral gearing heretofore employed.

(3) Reductions suitable for motor vehicle use are obtained by the type of gearing rather than by the size.

(4) A compact arrangement of a minimum number of gears and coaxial mounting of the driven gear wheels.

(5) Shifting is conducted at less than engine speed.

(6) A single clutch member is engageable with gear wheels of varying type and size.

(7) Lubrication of the transmission and differential is simplified.

(8) Abolition of the gear box which produces a sounding box effect on the body.

(9) Flexibility in adapting the drive from the crank shaft to the rear axle in different types of vehicles by passing the drive shaft above or below the axle shaft.

While in the preferred embodiment of the invention we have shown but two speeds an intermediate speed may readily be incorporated by the addition of another set of skew bevel gearing, preferably of the hypoid form.

It is to be understood that the hypoid form may also be substituted for either the straight skew bevel 10 or the worm 9.

We claim:

1. In a motor vehicle, a rear axle housing, a pair of axle shafts, a differential mechanism, a skew bevel wheel and a worm wheel mounted on the differential housing, a ring gear secured to the worm wheel, pinions carried by the axle housing and meshing with the ring gear, a sun wheel concentric with the worm wheel and meshing with the pinions, a drive shaft carrying a worm and a skew bevel pinion, and a clutch slidably keyed to the differential housing and adapted to internally engage the skew, worm and sun wheels.

2. In a motor vehicle, a rear axle housing, a pair of axle shafts, a differential mechanism for said shafts, a plurality of driven gear wheels concentric with the axles, a train of spur reduction gearing actuated from one of said wheels and engageable with the differential housing, a drive shaft, pinions on the drive shaft in mesh with the gear wheels, and a sliding clutch keyed to the differential housing for selectively connecting said housing to the driven wheels and to the final spur reduction gear.

3. A transmission embodying a drive shaft, a worm and a skew bevel pinion on said shaft, a member to be driven, a worm wheel and skew bevel wheel concentric on said member and in mesh respectively with the worm and pinion, a reduction gear train actuated by the worm wheel and means for selectively engaging said member with the worm and skew wheel and with the reduction gearing.

4. A transmission embodying a drive shaft, a worm and a skew bevel pinion on said shaft, a member to be driven, a worm wheel and skew bevel wheel concentric on said member and in mesh respectively with the worm and pinion, reverse gearing actuated by the worm wheel and means for selectively engaging said member with the worm and skew wheel and the reverse gearing.

5. A transmission embodying a drive shaft, a worm and a skew bevel pinion on said shaft, a worm wheel and a skew bevel wheel in mesh respectively with the worm and pinion, reverse gearing actuated by one of said wheels and concentric therewith, a member to be driven and means for selectively engaging said member with the worm and skew wheels and with the reverse gearing.

HARRY A. KNOX.
BERT F. BAKER.